United States Patent
Honma et al.

(10) Patent No.: US 6,720,956 B1
(45) Date of Patent: Apr. 13, 2004

(54) APPARATUS AND METHOD FOR OBTAINING GEOGRAPHICAL INFORMATION USING A TOUCH-SENSITIVE GLOBE DEVICE

(75) Inventors: Ted T. Honma, Portland, OR (US); Steven L. Pollock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 353 days.

(21) Appl. No.: 09/608,646

(22) Filed: Jun. 30, 2000

(51) Int. Cl.⁷ .......................... G09G 5/00; G08C 21/00
(52) U.S. Cl. ................ 345/174; 178/18.01; 178/18.03; 178/18.04; 178/18.05; 178/18.06
(58) Field of Search ................................ 345/173, 174, 345/179; 178/18.01, 18.02, 18.03, 18.04, 18.05, 18.06, 18.07, 19.01, 19.02, 19.03

(56) References Cited

U.S. PATENT DOCUMENTS 5,686,705 A * 11/1997 Conroy et al. ............. 345/173
5,839,902 A * 11/1998 Wood ......................... 434/130
5,877,458 A * 3/1999 Flowers .................... 178/18.01
6,262,711 B1 * 7/2001 Cohen et al. ............... 345/173
6,396,477 B1 * 5/2002 Hinckley et al. ........... 345/173

* cited by examiner

Primary Examiner—Vijay Shankar
(74) Attorney, Agent, or Firm—Kenyon & Kenyon

(57) ABSTRACT

An apparatus is provided that includes a touch-sensitive three-dimensional globe and an information handling system coupled to the touch-sensitive three-dimensional globe and adapted to receive the signals corresponding to the touched area of the globe. The information handling system may include a display device to display information regarding the area. A data accessing system may be coupled to the information handling system and be adapted to receive signals from the information handling system and transmit information from a data storage unit to the information handling system.

22 Claims, 6 Drawing Sheets

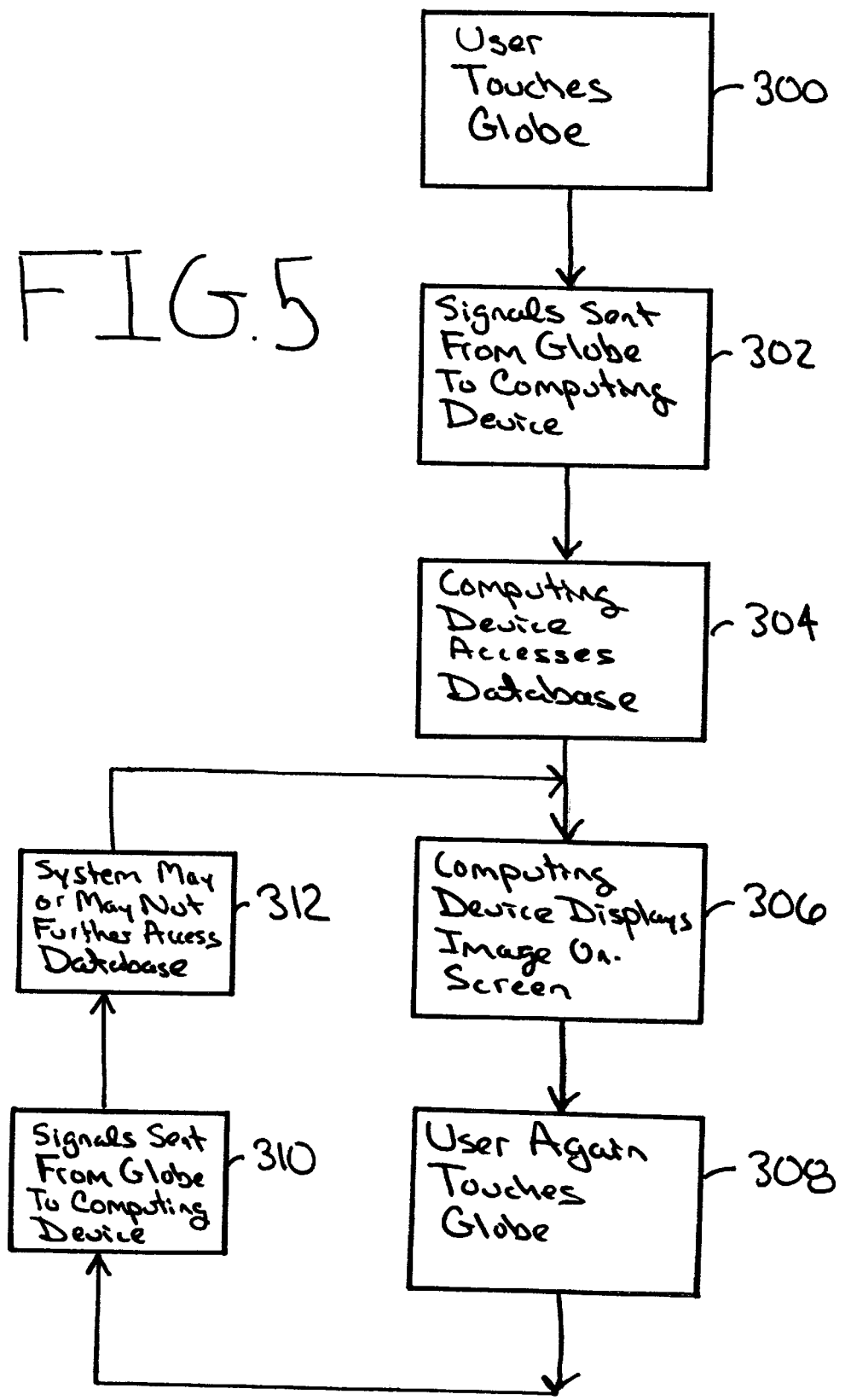

APPARATUS AND METHOD FOR OBTAINING GEOGRAPHICAL INFORMATION USING A TOUCH-SENSITIVE GLOBE DEVICE

FIELD

The present invention is directed towards a touch-sensitive globe device and method of using the same. More particularly, the present invention is directed toward a touch-sensitive globe device that accesses a database to obtain information regarding the globe.

BACKGROUND

Education of children is one of society's leading goals. One subject often taught to children is geography of local areas, the United States and foreign countries. For example, many classrooms contain globes or maps depicting different regions, countries and continents throughout the world. However, these globes and maps provide very limited information regarding the different regions, countries and continents.

Modern day classrooms may contain personal computers that have the ability to access information not previously available in classrooms. However, many personal computers require the inputting of information (e.g. a search request) through a mouse and/or a keyboard. The use of a mouse and keyboard may not be exciting to children especially after using these devices for any length of time. It is therefore desirable to obtain information using more interesting types of devices. This would encourage children to learn by making education more exciting.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein:

FIG. 5 shows a flow chart of one example embodiment according to the present invention.

DETAILED DESCRIPTION

Figure 1:
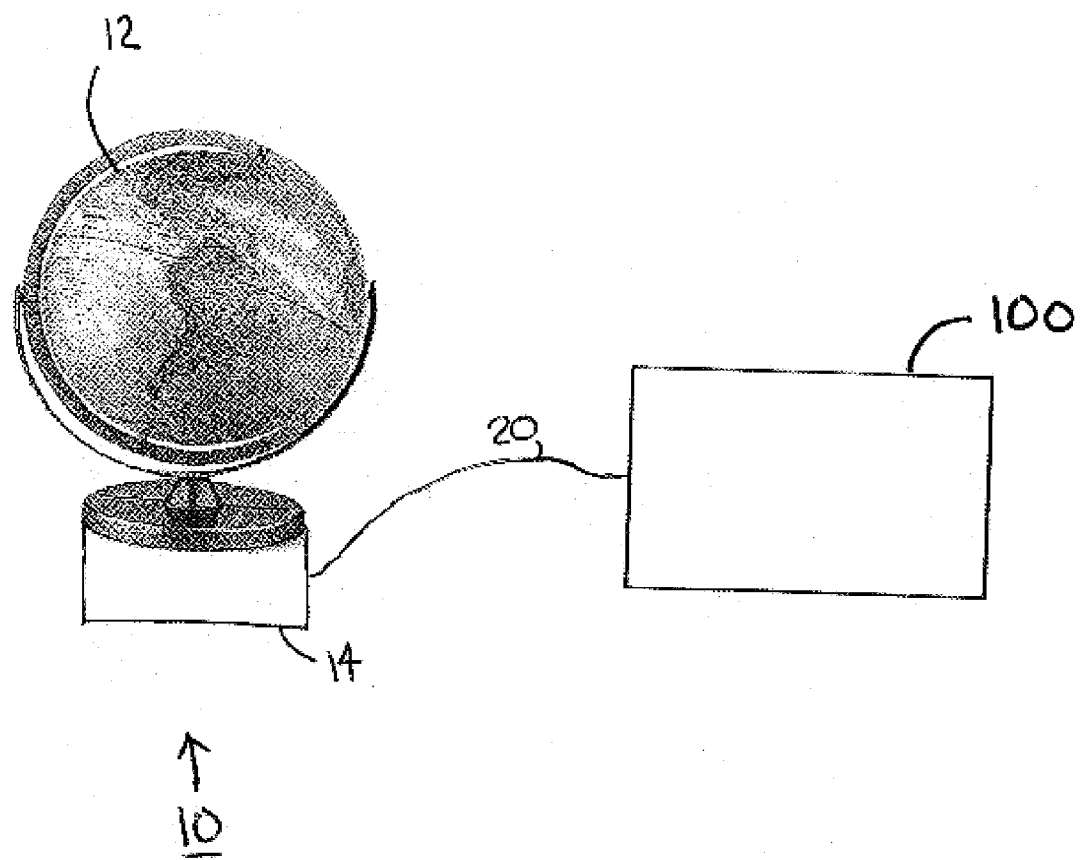
FIG. 1 shows a three-dimensional globe device and information handling system according to an example embodiment of the present invention.

A detailed description of the present invention will now be provided by referencing the accompanying Figures. When appropriate, like reference numerals and characters may be used to designate identical, corresponding or similar components in differing figure drawings. Furthermore, the arrangements of the present invention may be shown in block diagram form in order to avoid obscuring the invention, and also in view of the fact that specifics with respect to implementation of such block diagram arrangements may be dependent upon the platform within which the present invention is to be implemented, i.e., specifics are well within the purview of one skilled in the art. Where specific details are set forth in order to describe example embodiments of the invention, it should be apparent to one skilled in the art that the invention can be practiced without these specific details. It should also be apparent that other combinations of hardware circuitry and software instructions may be used to implement various embodiments of the present invention, i.e., the present invention is not limited to any specific combination of hardware circuitry and software instructions. Although an example embodiment of the present invention will be described using an example system block diagram in an example personal computer environment, the practice of the invention is not limited thereto, i.e., the invention may be practiced with other types of systems and in other types of environments or networks.

FIG. 1 illustrates an example embodiment of the present invention. More particularly, FIG. 1 shows a touch-sensitive three-dimensional globe device 10 (hereinafter also referred to as the globe device or the touch-sensitive globe device). The globe device 10 includes a spherical globe 12 and touch-sensitive material such as a touch-sensitive screen that may be provided beneath the outer circumference of the globe 12 or outside of the outer circumference of the globe 12. In one embodiment, the touch-sensitive material may be fabricated to include the different regions (i.e., the different continents, countries and oceans) of the globe 12 thereon. The touch-sensitive material operates such that when a user touches the material, signals are created to identify the position of the material that was touched. The touched position of the touch-sensitive material corresponds with a specific location on the globe 12.

The touch-sensitive globe device 10 also may include a processor and logic unit 14 that receives the signals that are generated when the touch-sensitive material is touched. The processor and logic unit 14 receives signals from the touch-sensitive material and processes those signals for transmission across a communication link 20 to an information handling system 100. The communication link 20 may be any type of communication link for transporting signals including but not limited to a universal serial bus cable, a parallel cable or a wireless communication link. Other types of communication links 20 are also within the scope of the present invention.

The information handling system 100 may be a personal computer (PC) that is adapted to receive signals over the communication link 20. The information handling system 100 may also be a laptop computer, main frame computer or any other type of device that may receive signals over the communication link 20. The system operates such that when the user touches the device globe 10, then signals corresponding to the area or region touched are sent across the communication link 20 to the information handling system 100.

Figure 2:
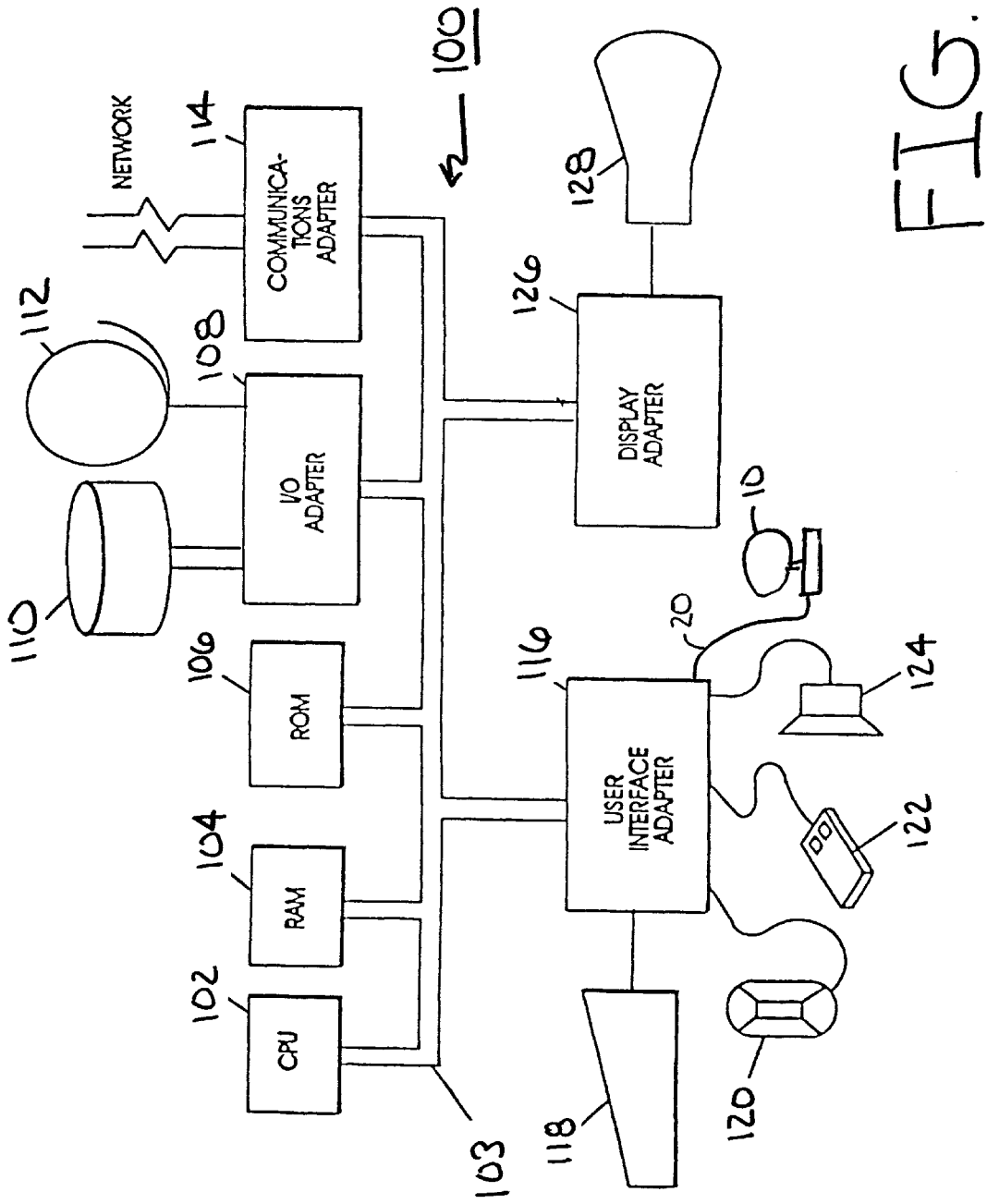
FIG. 2 shows an example embodiment of an information handling system according to the present invention.

FIG. 2 illustrates one embodiment of a hardware configuration of the information handling system 100. Such a system may include at least one processor 102 that may be interconnected via a system bus 103 to a random access memory (RAM) 104, a read-only memory (ROM) 106, an input/output (I/O) adapter 108 (for connecting peripheral devices such as disk units 110 and tape drives 112 to the bus 103), a communications adapter 114 (for connecting the information handling system to a data processing network or the Internet), a user interface adapter 116 (for connecting a keyboard 118, a microphone 120, a mouse 122, a speaker 124 and the touch-sensitive three-dimensional globe device 10 and/or any other user interface devices to the bus 103), and a display adapter 126 (for connecting the bus 103 to a display device 128). Other configurations are also within the scope of the present invention.

Figure 3:
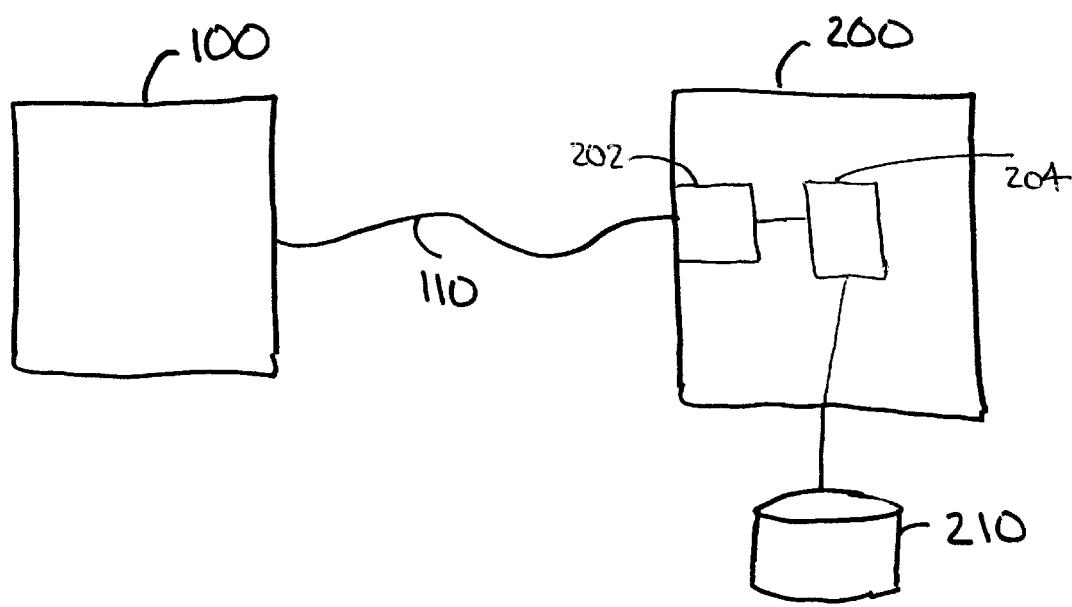
FIG. 3 shows the information handling system coupled to a database accessed through the Internet according to an example embodiment of the present invention.

FIG. 3 shows the information handling system 100 coupled to a data accessing system 200 via a communication link 110. The communication link 110 may include a standard hard wire connection, a wireless connection or any other viable way of transporting signals. The data accessing system 200 may include any type of information handling system that includes a communication device 202 that may receive signals corresponding to a touched area of the globe 12 and a processor 204 coupled to the communication device 202. The data accessing system 200 may access a data source such as a database 210 or any type of data storage medium. The database 210 may contain information pertaining to areas of the touch-sensitive three-dimensional globe device 10. In one embodiment, the communication link 110 may be a communication link to the Internet. The data accessing system 200 may also include the hardware and software to maintain a dedicated web page corresponding to the globe device 10 as will be described below. The information handling system 100 may transmit signals across the communication link 110 to the data accessing system 200 that accesses information within the database 210 based on the signals transmitted across the communication link 110.

Operation of the overall system will now be described with respect to an example embodiment. This example embodiment is merely illustrative of the present invention and is not meant to limit the present invention. That is, other embodiments, configurations and connections are also within the scope of the present invention. A software program (hereafter called the interactive globe program) may be provided within the information handling system 100. This interactive globe program may handle interactions between the touch-sensitive globe device 10 and the data accessing system 200. The program may be initially started by a user loading the program on the information handling system 100. The information handling system 100 may then await signals from the globe device 10 corresponding to areas/regions of the globe 12 touched by a user. The interactive globe program on the information handling system 100 may then access the database 210 across the communication link 110 by using the data accessing system 200 or any other type of data accessing. The present invention may also be applicable to the user initially touching the touch-sensitive globe device 10, thereby causing a signal to be sent across communication link 20 to the information handling system 200 that starts execution of the program based on this signal. Thus, the interactive globe program does not need to be initially running on the information handling system 100. The touch-sensitive globe device 10 may also include an on/off button (not shown) that may be depressed by the user to generate a signal that is sent across the communication link 20 to start the interactive globe program on the information handling system 100.

As discussed above, when the user touches the globe 12, signals may be generated by the touch-sensitive globe device 10 identifying the location the user touched. The signals may be sent across the communication link 20 to the information handling system 100. Again, the information handling system 100 may already have the interactive globe program running thereon or the signals may cause the interactive globe program to begin executing. The signals transmitted from the globe device 10 to the information handling system 100 may represent the exact position on the globe 12 that the user touched or the signals may correspond to a larger area or region of the globe 12 (i.e., a continent, ocean, country, etc.) in which the user touched.

Upon receiving the signals regarding the area or region that was touched by the user, the information handling system 100 may interact with the data accessing system 200 to obtain information from the database 210 regarding the area/region that was touched. In one embodiment, the information handling system 100 may have already interacted with the data accessing system 200 prior to receiving the signals corresponding to the area/region touched by the user. For example, the information handling system 100 may access a dedicated Internet web page designed for use with the touch-sensitive globe device 10. This web page may include pertinent information and links to other web pages regarding different geographical areas and information that may be accessed from the globe device 10. This information may be provided on the web page or may be obtained from the database 210. The user may then interact with the web page using the keyboard 118, the microphone 120, the mouse 122, the globe device 10 or any other peripheral device to the information handling system 100. The dedicated web page may also be accessible to any individuals across the world wide web even if they are not using the touch-sensitive globe device 10. That is, the dedicated web page may be accessed by individuals using their normal personal computers.

Figure 4A:
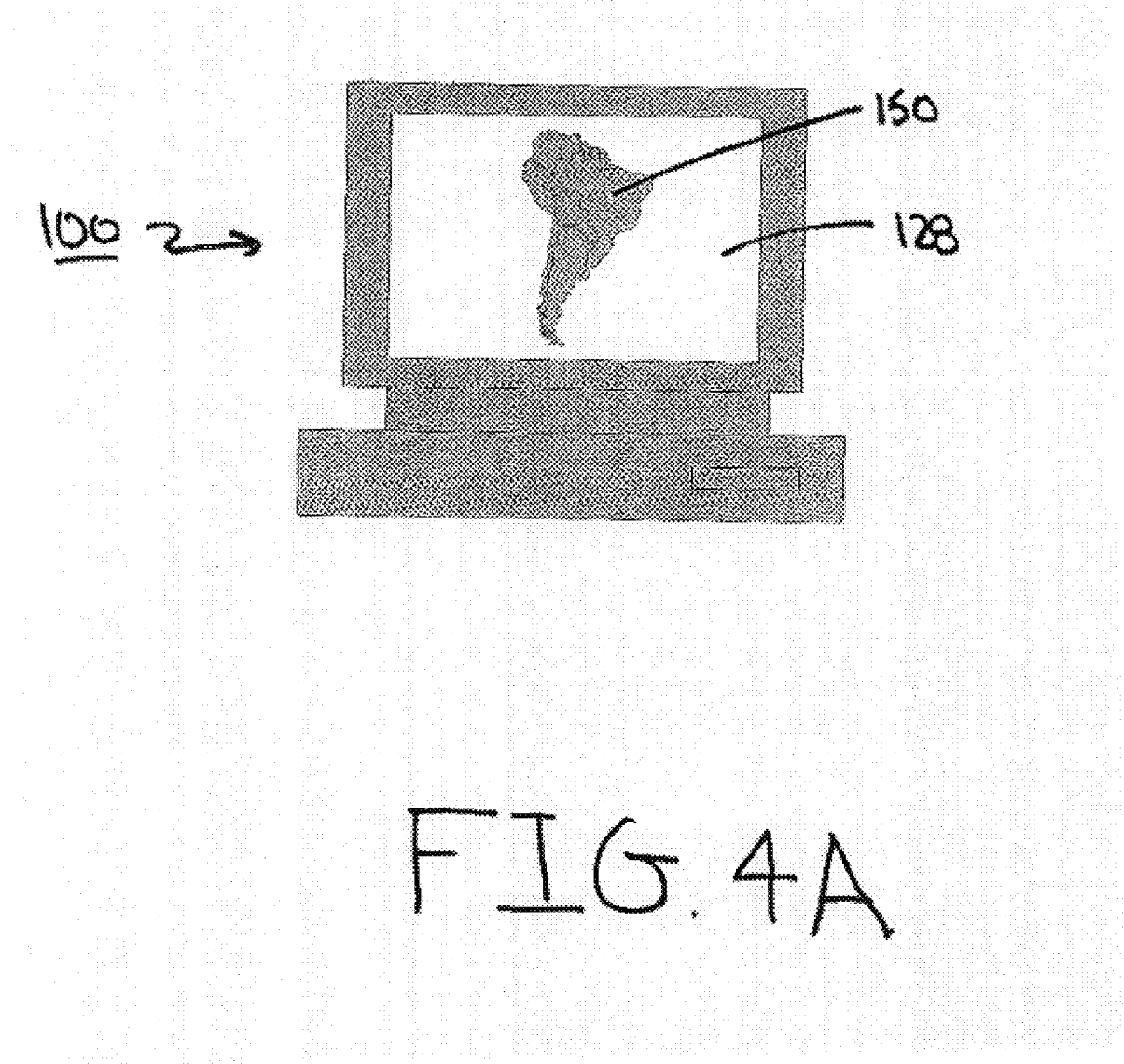
FIG. 4A shows a display device having South America displayed thereon.
Figure 4B:
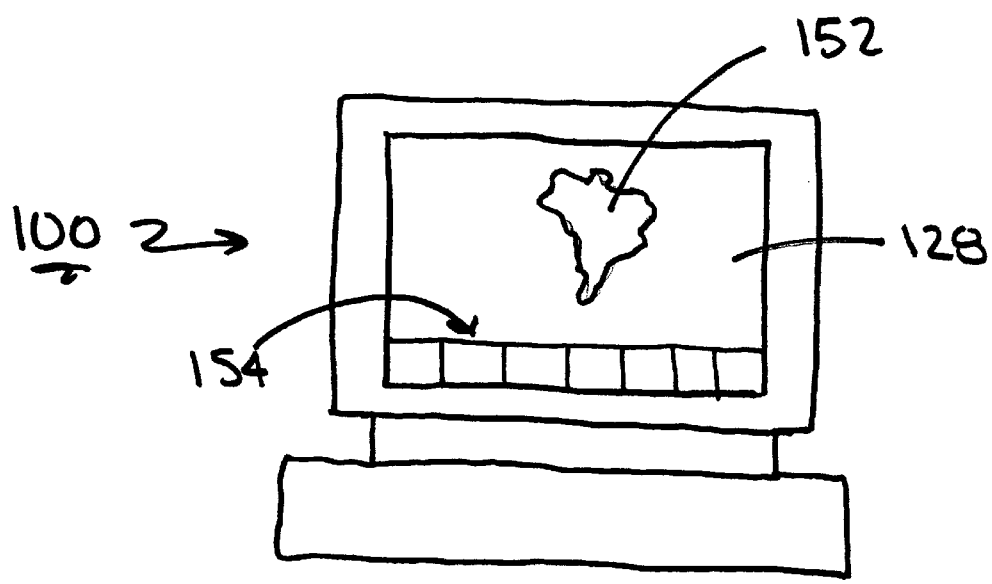
FIG. 4B shows a display device having Brazil and a menu displayed thereon.

Signals may be transmitted from the data accessing system 200 to the information handling system 100 across the communication link 110. The information handling system 100 displays information regarding the touched region of the globe device 10 on the display device 128. For example, if the user touches an area on the globe 12 within the continent of South America, then the information handling system 100 may receive signals from the data accessing system 200 regarding this region. As shown in FIG. 4A, the information handling system 100 may display a graphical image of South America 150 on the display device 128. The display device 128 may also display textual information, a video image or combinations of graphical images, textual information and/or video images on the display device 128. The interactive globe program on the information handling system 100 may also operate in a hierarchical manner such that each touch of the globe 12 causes the display device 128 to zoom in on a smaller region/area that was touched. That is, subsequent to displaying the South American continent, if the user again touches the globe 12 within the South America continent, then the globe device 10 may transmit signals regarding the area touched by the user. The information handling system 100 may appropriately display more detailed information regarding the area that was touched by the user, such as the specific country that was touched. In this example, if the user initially touches the globe 12 somewhere within the boundaries of South America, then the entire continent of South America may be displayed. Then, if the user touches the country of Brazil within the displayed South America, then an image of the country of Brazil 152 may be displayed as shown in FIG. 4B. As discussed above, the display device 128 may display textual information, video images, graphical images and/or any combination of textual information, graphical images and video images.

In this example, when the information handling system 100 receives signals indicating that the country of Brazil was touched on the globe 12, the information handling system 100 may or may not have to further access the database 210 through the data accessing system 200. That is, detailed information regarding each of the respective countries or regions of South America may have already been transmitted to the information handling system 100 from the database 210. In such case, it may not be necessary to again access the database 210 because the more detailed information is already located on (or within) the information handling system 100 or an appropriate data storage unit coupled thereto. Alternatively, the information handling system 100 may access the database 210 to obtain the more detailed information regarding the region or country that was touched on the globe 12.

As shown in FIG. 4B, the display device 128 may also include a menu 154 of items that allows the user to interact with the system using other peripheral devices such as the mouse 122, the keyboard 118 or the microphone 120. For example, the menu of items 154 may include selections for different types of categories of information such as but not limited to geographical information (i.e., specific countries, cities, rivers, etc.), weather information, travel information, agricultural information, government information and any other type of information that may be pertinent to the respective region, area, continent, river, ocean, country, etc. The menu 154 may also be used to narrow a search request from a continent to any number of countries within that continent. In essence, the use of the touch-sensitive globe device 10 and other peripheral devices may be used to access a virtually unlimited amount of information. The user may use not only the touch-sensitive globe device 10 but also may use the keyboard 118, the mouse 122 or the microphone 120 to further access the information. The ability to narrow a search to more specific regions, countries, oceans, countries etc. is a hierarchical approach to using the present invention. For example, the hierarchical approach allows a user to narrow a search from a continent to a country to a town.

The database 210 may be accessed in other manners than that described above and as shown in FIG. 3. That is, the database 210 may be directly connected to the information handling system 100 and include any type of ROM, RAM or software that may interact with the information handling system 100 to obtain the information.

FIG. 5 is a flow chart illustrating one embodiment of how the overall system (i.e., the globe device 10, the information handling system 100 and the data accessing system 200) may interact between the different components. This flowchart is merely illustrative of one example embodiment as other embodiments are also within the scope of the present invention.

As shown in FIG. 5, the user touches the globe 12 in block 300. In block 302, signals are sent from the globe device 10 to the information handling system 100 signaling where the user has touched the globe 12. In block 304, the information handling system 100 accesses the database 210 such as through a data accessing system (i.e., on the worldwide web) or through a direct connection to the information handling system 100. The information handling system 100 obtains information regarding the touched area or region. The information handling system 100 displays an image on the display device 128 in block 306. As discussed above, the displayed image may include any type of graphical image, video image, textual information or menu items. In block 308, the user may again touch the globe 12 or may use any other type of peripheral input device in order to obtain more detailed information regarding a specific area or region. Then, signals regarding the touched area are generated and transmitted (block 310) from the globe device 10 to the information handling system 100 to signify where the user touched the globe 12. If the user utilizes a different type of peripheral input device, then signals may be transmitted from the respective peripheral device to the information handling system 100. In block 312, the information handling system may or may not further access the database 210 depending on whether the desired information is already located within the information handling system 100. If it is necessary to access the database 210, then signals may be transmitted across the communication link 110 to the data accessing system 200 in order to access the database 210. The information handling system 100 may then display more detailed images on the screen in block 306. These may be video, textual or graphical images. Blocks 308, 310, 312 and 306 may be repeated any number of times such as until the user exits the interactive globe program or the interactive globe program times itself out by not having any interaction for a predetermined amount of time.

Instructions for performing the various features of the present invention may be provided on any number of tangible storage mediums, including but not limited to, CD-ROM, diskettes, tapes, etc. The software may also be downloaded from any other computer network, downloaded from the Internet or Worldwide Web, transferred by Wireless Communication Network, or any other viable method. Software may be provided in the touch-sensitive globe device 10, the information handling system 100 and the data accessing system 200. More specifically, each of these devices may include software to perform the features discussed above.

While the above example embodiments describe a touch-sensitive globe device 10 coupled to a local computing system which may be coupled to the world wide web, other examples of computer networks are also included within the present invention. Other computer networks may include a local area network (LAN), a wide area network (WAN), a campus area network (CAN), a metropolitan area network (MAN), a global area network (GAN) and a system area network (SAN).

While the invention has been described with reference to specific example embodiments, the description of the specific example embodiments is illustrative only and is not to be considered as limiting the scope of the invention. That is, various other modifications and changes may occur to those skilled in the art without departing from the spirit and scope of the invention.

What is claimed is:

1. An apparatus comprising a three-dimensional globe and a touch-sensitive device coupled to said three-dimensional globe such that said touch-sensitive device is to transmit a first signal in response to a user touching a location on said three-dimensional globe at a first time, said first signal representing a first geographical area/region, said first geographical area/region being based on the location of said globe touched by said user, the touch-sensitive device further to transmit second signals in response to the user touching substantially the same location on the three-dimensional globe for second and subsequent times, the second signals representing a second geographical area/region, said second geographical area/region being based on the location of the globe touched by the user, the second geographical area/region being smaller than the first geographical area/region.

2. The apparatus of claim 1, further comprising a display device to display said first geographical area/region based on said first signals and to display said second geographical area/region based on said second signals.

3. An apparatus comprising:
a globe device having a touch-sensitive three-dimensional globe, the globe device to generate signals representing a geographical area/region, said geographical area/region being based on a location of said globe touched by a user; and
an information handling system coupled to said globe device and to receive said signals representing said geographical area/region, said information handling system including a communications device to receive information from the Internet regarding the geographical area/region selected by the user, the information handling system further including a display device to display information received from said Internet regarding said geographical area/region.

4. The apparatus of claim 3, wherein said displayed information comprises an Internet web page.

5. A method for obtaining information comprising:
receiving first signals from a globe device having a touch-sensitive three-dimensional globe, said first signals representing a first geographical area/region, said first geographical area/region being based on a location of said globe touched by a user;
in response to said first signals representing the first geographical area/region selected by the user, obtaining information from the Internet regarding said first geographical area/region; and
displaying a representation of said information on a display device.

6. The method of claim 5, further comprising:
receiving second signals from said globe device, said second signals representing a second geographical area/region, said second geographical area/region being based on said location of said globe being again touched by said user; and
displaying a further representation on said display device based on said second signals.

7. The method of claim 6, further comprising in response to said second signals, accessing information from the Internet relating to said further representation.

8. A tangible storage medium tangibly embodying a set of instructions to perform a method of obtaining information, said method comprising:
receiving first signals from a globe device having a touch-sensitive three-dimensional globe, said first signals representing a first geographical area/region, said first geographical area/region being based on a location of said globe touched by a user;
in response to said first signals representing the first geographical area/region selected by the user on the globe, obtaining information from the Internet corresponding to said first geographical area/region; and
displaying a representation of said information on a display device.

9. The tangible storage medium of claim 8, further comprising:
receiving second signals from said globe device, said second signals representing a second geographical area/region, said second geographical area/region being based on said location of said globe being again touched by said user; and
displaying a further representation on said display device based on said second signals.

10. A method comprising:
receiving first signals from a globe device having a touch-sensitive three-dimensional globe, the first signals representing a first geographical area/region, said first geographical area/region being based on a location of the globe touched by a user for the first time;
displaying a representation of the first geographical area/region based on the first signals;
receiving second signals from the globe device, the second signals representing a second geographical area/region of the globe, said second geographical area/region being based on the same location being touched by the user for the second time; and
displaying a representation of the second geographical area/region based on the second signals, the second geographical area/region being smaller than the first geographical area/region.

11. The method of claim 10, wherein the first geographical area/region corresponds to a continent.

12. The method of claim 11, wherein the second geographical area/region corresponds to a country.

13. The method of claim 10, further comprising receiving third signals from the globe device, the third signals representing a third geographical area/region of the globe, said third geographical area/region being based on the location being again touched by the user for the third time, the third geographical area/region being smaller than, the second geographical area/region.

14. The method of claim 13, wherein the third geographical area/region corresponds to a city.

15. The method of claim 10, further comprising accessing an information source containing information regarding the first geographical area/region.

16. The method of claim 15, wherein the information source comprises the Internet.

17. A method comprising:
receiving first signals from a globe device having a touch-sensitive three-dimensional globe, the first signals representing a first geographical area/region of the globe, said first geographical area/region being based on a location on the globe touched by a user; and
accessing the Internet based on the first signals to obtain information regarding the first geographical area/region that correspond to the location on the globe touched by the user.

18. The method of claim 17, further comprising displaying the information accessed from the Internet.

19. The method of claim 17, further comprising receiving second signals from the globe device, the second signals representing a second geographical area/region, said second geographical area/region being based on the location of said globe device being again touched by the user, the second geographical area/region being smaller than the first geographical area/region.

20. The method of claim 19, further comprising accessing the Internet based on the second signals to obtain information corresponding to said second geographical area/region.

21. The method of claim 16, further comprising displaying information regarding the second geographical area/regions.

22. The method of claim 17, wherein accessing the Internet comprises accessing an Internet web page.

* * * * *